Oct. 21, 1947.  F. ARBOGAST  2,429,339
HOOK ATTACHMENT FOR ARTIFICIAL BAIT
Filed Nov. 7, 1945
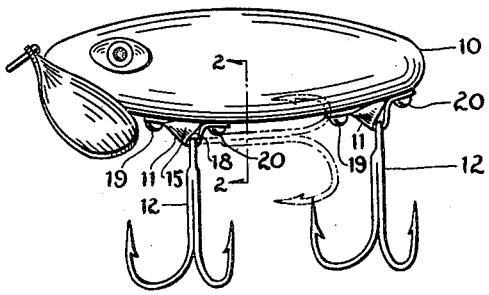
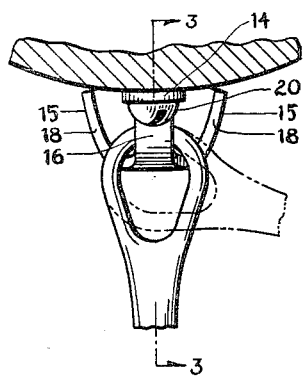
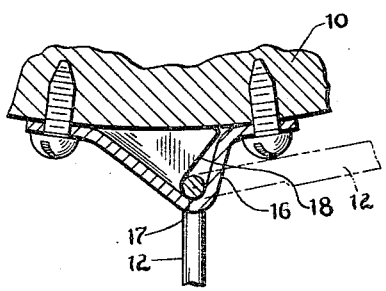
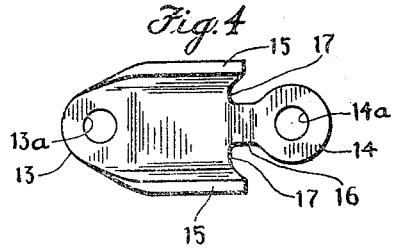
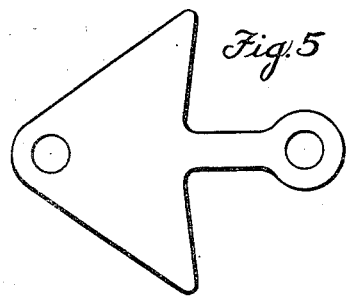
INVENTOR
Fred Arbogast
BY
William Cleland
ATTORNEY Patented Oct. 21, 1947

2,429,339

UNITED STATES PATENT OFFICE 2,429,339

HOOK ATTACHMENT FOR ARTIFICIAL BAIT

Fred Arbogast, Akron, Ohio

Application November 7, 1945, Serial No. 627,135

4 Claims. (Cl. 43—28)

This invention relates to a hook attachment for artificial bait.

An object of the invention is to provide an economical one-piece hook attachment for artificial bait, including simple and effective means for limiting swinging movement of the hook in all directions, and thereby to prevent engagement of the point or points of the hook with the bait body which would tend to damage the surface of said body.

Another object of the invention is to provide a hook attachment of the character described which may be produced by use of a minimum of blanking and forming operations.

Other objects of the invention will be manifest from the following brief description and the accompanying drawings.

Of the accompanying drawings:

Figure 1 is a side elevation of an artificial bait having thereon hook attachments embodying the features of the invention.

Figure 2 is a vertical cross-section, on an enlarged scale, taken on line 2—2 of Figure 1 and illustrating a rear end view of an attachment.

Figure 3 is a vertical cross-section taken on line 3—3 of Figure 2.

Figure 4 is a top plan view of the attachment.

Figure 5 is a top plan view of developed blank for forming the attachment shown in Figure 4.

Referring particularly to Figure 1 there is illustrated an artificial bait of known type having an elongated body 10. Secured in spaced relation to the underside of said body may be attachments 11, 11 constructed in accordance with the present invention for pivotally attaching fish hooks 12, 12, a three barb type of hook being shown.

As best shown in Figures 2, 3 and 4, the improved hook attachment is formed in known manner from a one-piece blank (see Figure 5), to provide a body portion which is outwardly arched longitudinally thereof and terminates at the forward and rearward ends in lugs 13 and 14, respectively, which lie substantially in a plane. The body is laterally formed to provide spaced inturned side portions 15, 15 which extend substantially to said plane of the lugs.

The forward end of the body is made relatively narrow to provide a rearwardly presented, inwardly extending tang 16 adapted to be received through the eye of a fish hook 12, and also to provide laterally extending, rearwardly presented shoulder portions 17, 17, for limiting forward swinging movement of hook 12 beyond the full line positions thereof shown in Figures 1, 2 and 3.

The lug 14 also may be made small enough to be received through the eye of the hook.

The side portions 15 are shaped to provide rearwardly and inwardly inclined edge portions 18, which extend substantially to the base of tang 16, the arrangement being such that said edge portion 18 will limit lateral swinging movement of hook 12 on the tang 16, as indicated in chain-dotted lines in Figure 2.

The attachments 11 may be secured to the body of the bait by means of round-head screws 19 and 20, received through the apertures 13a and 14a of the lugs 13 and 14, respectively. As best shown in chain-dotted lines in Figure 1, the outwardly projecting head of screw 20 limits rearward swinging of the hook to prevent contact of the points thereof with the surface of the bait body 10.

In the use of the bait with the hook attachments 11 on body 10 thereof, the hooks 12 are free to swing rearwardly in desired manner. The swinging movement of the hooks, however, is limited in forward and lateral directions by the shoulder portions 17 and the inclined side portions 18 of the body, respectively, the arrangement being such that in no position of swinging movement of the hooks 12 may the points thereof engage the body of the bait to scratch or mar the surface finish thereof.

Modifications of the invention may be resorted to without departing from the spirit thereof or the scope of the appended claims.

What is claimed is:

1. A hook attachment for artificial bait, comprising an arched body providing a tang adapted to be received through the eye of a fish hook, said body having laterally extending portions providing shoulders to limit swinging movement of the hook on said tang in one longitudinal direction, said laterally extending portions having extensions in the other longitudinal direction for limiting lateral swinging movement of the hook on said tang, and means on said body for securing the same to an artificial bait.

2. A hook attachment for artificial bait, comprising a body formed of a one-piece blank, said body being outwardly arched longitudinally thereof and being reduced in width from a point intermediate the ends thereof to provide a tang adapted to be received through the eye of a fish hook and to provide laterally extending shoulder portions for limiting swinging movement of the hook on the tang in one longitudinal direction, said body having inturned side portions providing longitudinally and inwardly inclined edges for limiting lateral swinging movement of the hook on said tang, and means on said body for securing the same to an artificial bait.

3. A hook attachment for artificial bait, comprising a body formed of a one-piece blank, said body being outwardly arched longitudinally thereof and being reduced in width from a point intermediate the ends thereof to provide a tang adapted to be received through the eye of a fish hook and to provide laterally extending shoulder portions for limiting swinging movement of the hook on the tang in one longitudinal direction, said body having inturned side portions providing longitudinally extending and outwardly presented edges for limiting lateral swinging movement of the hook on said tang, and means on said body for securing the same to an artificial bait.

4. A hook attachment for artificial bait, comprising a body formed of a one-piece blank, said body being outwardly arched longitudinally thereof and being reduced in width to provide a rearwardly presented tang adapted to be received through the eye of a fish hook and to provide laterally extending, rearwardly presented shoulder portions for limiting forward swinging movement of the hook on the tang, said body having inturned side portions providing rearwardly and inwardly inclined edge portions for limiting lateral swinging movement of the hook on said tang, and said body being provided at the forward and rearward ends with apertured lugs for securing the same to an artificial bait.

FRED ARBOGAST.